United States Patent [19]

Durand et al.

[11] 4,342,853
[45] Aug. 3, 1982

[54] PROCESS FOR MANUFACTURING ETHYLENE POLYMERS

[75] Inventors: Pierre Durand, Neuilly sur Seine; Pierre Gloriod, Saint Nicolas de la Taille, par Lillebonne, both of France

[73] Assignee: Societe Chimique des Charbonnages—CdF Chimie, Paris, France

[21] Appl. No.: 164,534

[22] Filed: Jul. 2, 1980

[30] Foreign Application Priority Data

Jul. 5, 1979 [FR] France .................... 79 17444

[51] Int. Cl.$^3$ .................................................. C08F 2/34
[52] U.S. Cl. ......................................... 526/68; 526/88
[58] Field of Search ............................. 526/68, 71, 88

[56] References Cited

U.S. PATENT DOCUMENTS

| | | | |
|---|---|---|---|
| 3,255,171 | 6/1966 | Eilbracht | 526/68 |
| 3,306,889 | 2/1967 | Schappert | 528/501 X |
| 3,551,397 | 12/1970 | Rätzsch | 526/68 |
| 3,627,746 | 12/1971 | Beals et al. | 528/484 |
| 3,719,643 | 3/1973 | Knight | 526/68 |
| 3,969,470 | 7/1976 | Spiegelman | 526/68 |
| 4,087,602 | 5/1978 | Mietzner | 528/501 X |
| 4,105,609 | 8/1978 | Machon | 526/84 X |
| 4,168,356 | 9/1979 | Levresse | 526/68 X |
| 4,175,169 | 11/1979 | Beals | 526/88 X |
| 4,215,207 | 7/1980 | Durand | 526/64 |

FOREIGN PATENT DOCUMENTS

| | | | |
|---|---|---|---|
| 991856 | 5/1965 | United Kingdom | 528/497 |
| 1313836 | 4/1973 | United Kingdom | 526/68 |
| 1441115 | 6/1976 | United Kingdom | 526/68 |
| 1540894 | 2/1979 | United Kingdom | 526/68 |

Primary Examiner—C. A. Henderson
Attorney, Agent, or Firm—Finnegan, Henderson, Farabow, Garrett & Dunner

[57] ABSTRACT

The energy efficiency of a high pressure, high temperature continuous process for the production of polyethylene is improved and residual gases are more completely removed from the product without detriment to product quality by employing an intermediate separator between the first and second separators. The intermediate separator is maintained at a pressure between about 10 and 70 bars, and the second separator is maintained at a pressure between about 1 and 1.5 bars.

2 Claims, 1 Drawing Figure

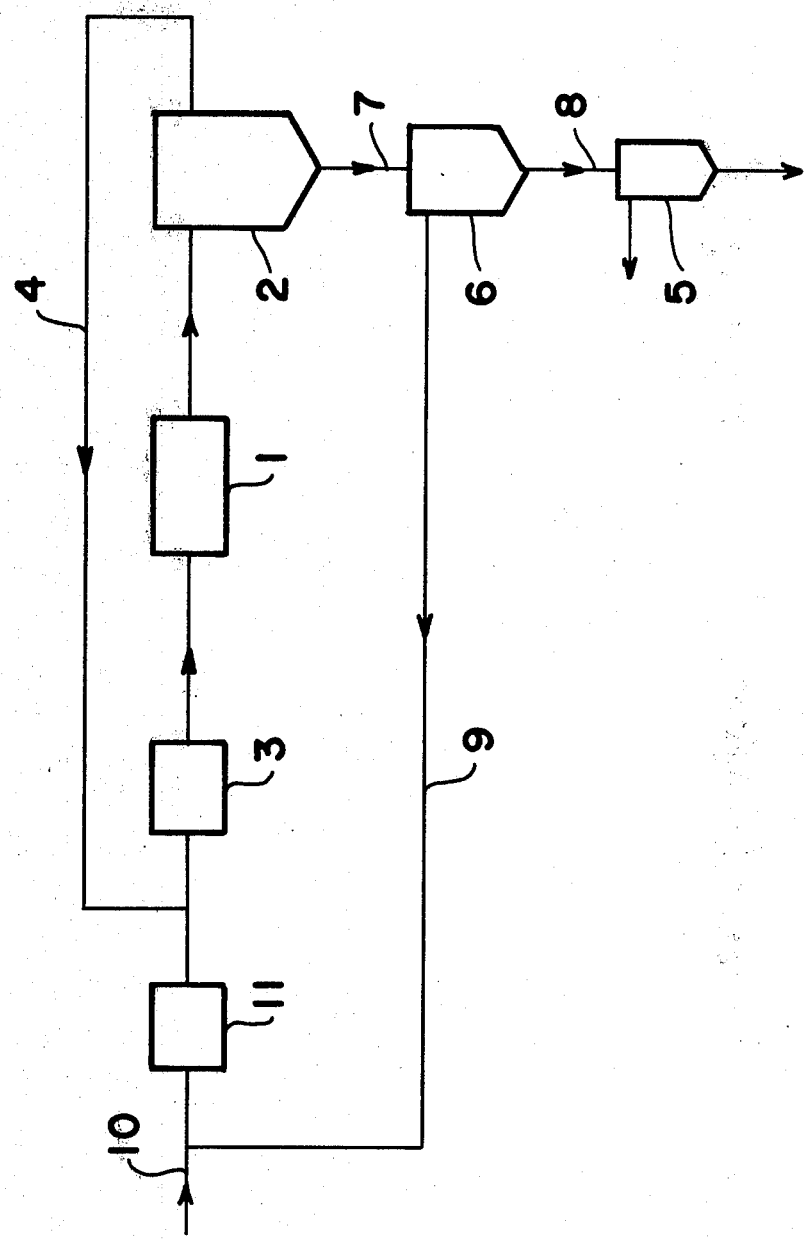

PROCESS FOR MANUFACTURING ETHYLENE POLYMERS

BACKGROUND OF THE INVENTION

The present invention relates to a process for the production of polymers of ethylene and an apparatus for operating the process.

Processes for polymerizing ethylene under high pressure (about 400 to 3000 bars) by means of either a free radical initiator, as in U.S. Pat. No. 3,255,171, or a catalytic system of the Ziegler type comprising an organometallic activator and a transition metal halide, as in British Pat. No. 1,441,115 have long been known.

In the continuous ethylene polymerization processes, the polymer produced is separated from the reaction mixture in a first separation zone under a pressure generally between 100 and 500 bars, and then in a second separation zone is maintained at a pressure as close as possible to atmospheric pressure: 2 atmospheres according to the examples in U.S. Pat. No. 3,551,397.

In the known polymerization processes cited above, the ethylene fraction separated in the second separation zone—a fairly large fraction since it generally represents 20 to 50% of the production of polymer—has to be passed to a booster to be compressed to the pressure of the ethylene feed flow, mixed with this flow, and compressed with it to the pressure of the first separation zone. The resulting mixture is then mixed with the ethylene fraction separated in the first separation zone and compressed with it to the working pressure of the reactor.

The process of recycling of ethylene cited above has two main disadvantages. Firstly it is wasteful of energy because it leads to the expansion followed immediately by recompression of a relatively large flow of ethylene (separated in the second separation zone), the supplementary cost in energy of this operation being all the greater because the pressure of the second zone of separation is lower. Secondly it permits only an incomplete degassing of the polymer produced, which results in difficulties in storing the polymers. The presence of residual gas in the storage areas causes a disagreeable odor, risks of explosion, and stress on the workers engaged in storage and handling. The development of standards in force in many countries in relation to toxicology, hygiene, and safety makes it likely that the present processes will soon no longer conform to these standards because they do not ensure adequate degassing of the polymers produced.

British Pat. No. 1,313,836 describes a process for the polymerization of ethylene under a pressure of 700 to 5000 bars at a temperature of 100° to 400° C., characterized by the presence of one or more high pressure separators, at least one of which works at a pressure of 500 to 1000 bars. According to the description in this patent, "high pressure" means at least 250 bars. This process, in a manner emphasized by the very high pressure chosen, has the same disadvantages as the processes cited above.

SUMMARY OF THE INVENTION

The object of the present invention is thus to provide a solution to the two disadvantages cited above of the known polymerization processes.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the process of the invention for the production of polymers of ethylene in a continuously operating system under a pressure between about 400 and 3000 bars and a temperature between about 150° and 320° C. comprises separating the polymers formed from the reaction mixture in a first separation zone maintained at a pressure between about 100 and 500 bars, further separating the polymer from the first separation zone from residual gases in an intermediate separation zone maintained at a pressure between about 10 and 70 bars, mixing the residual gases separated in the intermediate separation zone with an ethylene feed stream, compressing the mixture of residual gases and ethylene feed to the pressure of the first separation zone, and further separating the polymer from the intermediate separation zone in a second separation zone maintained at a pressure between about 1 and 1.5 bars.

To further achieve the objects of the present invention and in accordance with its purpose, as embodied and broadly described herein, the invention also relates to an apparatus for operating the process described above, which comprises:

(a) a polymerization reactor;
(b) a first separation zone, whose inlet is connected to the outlet of the reactor;
(c) a hypercompressor, whose outlet is connected to the inlet of the reactor 1;
(d) a gas conduit extending from an outlet of the first separation zone to the inlet of the hypercompressor;
(e) an intermediate separation zone, whose inlet is connected to an outlet of the first separation zone by a polymer conduit;
(f) a monomer feed conduit connected to the inlet of the hypercompressor;
(g) a gas conduit extending from an outlet of the intermediate separation zone to the monomer feed conduit; and
(h) a second separation zone, whose inlet is connected to an outlet of the intermediate separation zone.

The accompanying drawing, which is incorporated in and constitutes a part of this specification, illustrates one embodiment of the invention and, together with the description, serves to explain the principles of the invention.

BRIEF DESCRIPTION OF THE DRAWING

The drawing is a flow diagram of a process and apparatus in accordance with the present invention.

DESCRIPTION OF THE PREFERRED EMBODIMENTS

Reference will now be made in detail to the presently preferred embodiments of the invention, an example of which is illustrated in the accompanying drawing.

The basic concept for achieving the object of the invention is to introduce in the process of separation and recycling of ethylene a supplementary separation zone maintained at an intermediate pressure between that of the first separation zone and that of the second separation zone. In spite of its apparent simplicity, this concept is not easy to implement in an industrially effective manner, because the intermediate pressure must be chosen as a function of three partly contradictory objectives and of a physico-chemical constraint on which there is no means of acting. The three objectives are on the one hand, as shown above, reduction in the consumption of energy of the process and reduction in the difficulties in storing the polymer, and on the other hand maintenance of the quality of the production of the polymer measured by the physical and mechanical properties of the latter. It has then been observed that the introduction of a supplementary separation zone kept at an intermediate pressure permits reduction in the energy consumption and reduction of the odor of stored polymer, while keeping the polymer in a separation zone at high pressure tends to degrade the properties of the polymer and consequently the quality of production. The physico-chemical restraint that there is no means of affecting constitutes a variation as a function of pressure of the solubilities of the oligomers, oils, and impurities in the ethylene, which shows a singular point at a pressure of about 15 bars.

The present invention thus constitutes a choice of an industrially effective means of introducing a supplementary separation zone, that is, in particular, the choice of the intermediate pressure and the pressure of the second separation zone to ensure a good compromise between the three objectives cited above, while taking the physico-chemical constraints into account. The process according to the invention is a process for producing polymers of ethylene continuously under a pressure between about 400 and 3000 bars and a temperature between about 150° and 320° C., comprising a first step of separating the polymers from the reaction mixture in a first separation stage maintained at a pressure between about 100 and 500 bars, then a second step of separating the previously separated polymers from residual gas in a second separation zone maintained at a pressure between about 1 and 1.5 bars, characterized in that it comprises in addition an intermediate step of separating the residual gases from the polymers separated in the first step, the intermediate separation step being carried out in an intermediate separation zone maintained at a pressure between about 10 and 70 bars, the polymers separated in this intermediate zone being then passed on to the second separation zone, while the residual gases separated in this intermediate zone are mixed, after compression if necessary, with the ethylene feed flow and compressed with it to the pressure of the first separation zone. As in the known processes, the mixture of residual gases and feed is then mixed with the ethylene separated in the first separation zone and compressed with it to the working pressure of the process.

By ethylene polymers in the sense of the present invention is meant both homopolymers of ethylene and copolymers of ethylene with comonomers such as α-olefins (propylene, butene-1, methyl-4-pentene-1, hexene-1, octene-1, etc.) or polar monomers (maleic anhydride, vinyl acetate, ethyl acrylate, etc.).

It should be understood that the conditions of polymerization do not constitute a distinctive part of the present invention and that the conditions proposed (pressure between about 400 and 3000 bars, temperature between about 150° and 320° C.) only represent the most usual conditions in practice. Polymerization conditions deviating slightly from those proposed, such as notably a pressure above 3000 bars or a temperature above 320° C. (in particular in a tubular reactor), will not therefore be sufficient to fall outside the scope of the invention. However, the choice of clearly differentiated pressure conditions in the second separation step on the one hand and in the supplementary separation step on the other constitutes the characteristic feature of the invention. As regards the pressure in the first separation stage, it does not constitute a further distinctive part of the invention and those possessing ordinary skill in the art know how to choose it in relation to the polymerization pressure.

The present invention is applicable to polymerization by means of a free racial initiator (oxygen, peroxides, peresters) as well as by means of a catalytic system of the Ziegler type comprising an organo-metallic activator and a transition metal halide.

As the invention relates only to a specific process of separation and recycling of the ethylene, it is intended that any means of affecting the course of the polymerization or any means of controlling the same, such as the introduction of inhibitors or regulating agents or complexing agents at any stage whatever of the process that have been or may be used within the scope of known processes, may be used with the scope of the process according to the invention with increased ease and flexibility, because a supplementary zone is available to act on the polymerization or to control it. By way of supplementary examples of such means of action, we may cite the processes of cooling the first separation zone described in British Pat. No. 1,540,894 and copending application Ser. No. 016,540 filed Mar. 1, 1979, and the process of deactivation of catalyst described in U.S. Pat. No. 4,105,609.

The results which can be achieved by the present invention conform to its objects. On the one hand, the quality of the production, i.e. the physical and mechanical properties of the polymer is maintained at an identical level to that of the production achieved by the known processes. On the other hand, a strong reduction in the odor of the stored polymer is observed, due to its almost complete degassing. The invention therefore to a significant extent eliminates the nuisance caused to workers responsible for storage and to a large extent eliminates the need for ventilation installations in the storage areas. Finally, a reduction in energy consumption of the process is found, which varies with a large number of parameters, but is generally about 50 kWh per metric ton of polymer. This reduction in energy consumption is also accompanied by a reduction in investment for the production of polymer, because the invention eliminates the booster for compressing the ethylene separated in the second separation zone to the pressure of the ethylene feed stream.

The apparatus of the present invention comprises:
(a) a polymerization reactor 1;
(b) a first separation zone 2 whose inlet is connected to the outlet of the reactor 1;
(c) a hypercompressor 3, whose outlet is connected to the inlet of the reactor 1;
(d) a gas conduit 4 extending from an outlet of the first separation zone 2 to the inlet of the hypercompressor 3;
(e) an intermediate separation zone 6, whose inlet is connected to an outlet of the first separation zone 2 by a polymer conduit 7;
(f) a monomer feed conduit 10 connected to the inlet of the hypercompressor 3;
(g) a gas conduit 9 extending from an outlet of the intermediate separation zone 6 to the monomer feed conduit 10; and (h) a second separation zone 5, whose inlet is connected to an outlet of the intermediate separation zone 2.

The apparatus according to the invention may also comprise a compressor 11 interposed on the feed conduit 10 of the reactor between the point of connection of the gas conduit 9 originating from the intermediate separation zone 6 and the inlet of the hypercompressor 3 or the point of connection of the gas conduit 4 originating from the first separation zone 2. As proposed above, the apparatus according to the invention may also comprise means for cooling the first separation zone 2, such as an injector according to British Pat. No. 1,540,894 or a turbine according to French Pat. No. 78/06,030.

It will be apparent to those skilled in the art that various modifications and variations could be made in the process and apparatus of the invention without departing from the scope or spirit of the invention.

What is claimed is:

1. Process for the production of polymers of ethylene in a continuously operating reaction system under a pressure between about 400 and 3000 bars and a temperature between about 150° and 320° C., comprising separating the polymers formed from a reaction mixture in a first separation zone maintained at a pressure between about 100 and 500 bars to form a polymer stream and a gas stream, further separating the polymers from the first separation zone from residual gases in an intermediate separation zone maintained at a pressure between about 10 and 70 bars, mixing the residual gases separated in said intermediate zone with an ethylene feed stream, compressing said residual gas-ethylene feed mixture to the pressure of the first separation zone, and further separating the polymers from the intermediate separation zone in a second separation zone maintained at a pressure between about 1 and 1.5 bars.

2. Process according to claim 1, further comprising mixing the gases separated in said first separation zone with said compressed residual gas-ethylene feed mixture to form a reactant mixture, and compressing said reactant mixture to the pressure of said continuously operating reaction system.

* * * * *